United States Patent
Nakashima et al.

(10) Patent No.: US 10,063,726 B2
(45) Date of Patent: Aug. 28, 2018

(54) IMAGE PROCESSING APPARATUS

(71) Applicant: Brother Kogyo Kabushiki Kaisha, Nagoya-shi, Aichi-ken (JP)

(72) Inventors: Kazuhiro Nakashima, Nagoya (JP); Noriyuki Kawamata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/444,441

(22) Filed: Feb. 28, 2017

(65) Prior Publication Data

US 2017/0251120 A1 Aug. 31, 2017

(30) Foreign Application Priority Data

Feb. 29, 2016 (JP) ................................. 2016-037244

(51) Int. Cl.
H04N 1/60 (2006.01)
H04N 1/40 (2006.01)
H04N 1/00 (2006.01)

(52) U.S. Cl.
CPC ....... *H04N 1/00708* (2013.01); *H04N 1/0075* (2013.01); *H04N 1/00559* (2013.01); *H04N 1/00734* (2013.01); *H04N 1/00748* (2013.01); *H04N 2201/0094* (2013.01)

(58) Field of Classification Search
None
See application file for complete search history.

(56) References Cited

U.S. PATENT DOCUMENTS

| 6,791,719 | B1* | 9/2004 | Hisada | H04N 1/00347 358/400 |
|---|---|---|---|---|
| 8,724,181 | B2* | 5/2014 | Fujiwara | H04N 1/0083 358/474 |
| 9,654,658 | B2* | 5/2017 | Kawamata | H04N 1/00795 |
| 9,760,052 | B2* | 9/2017 | Sato | G03G 15/6529 |
| 9,785,093 | B2* | 10/2017 | Itabashi | G03G 15/0889 |
| 2006/0083564 | A1* | 4/2006 | Yazawa | B41J 29/023 399/363 |
| 2007/0122187 | A1* | 5/2007 | Mase | G03G 21/1853 399/111 |
| 2007/0146421 | A1* | 6/2007 | Samoto | B41J 19/005 347/37 |
| 2007/0165066 | A1* | 7/2007 | Samoto | B41J 19/005 347/37 |

(Continued)

FOREIGN PATENT DOCUMENTS

JP 5019239 B2 9/2012

*Primary Examiner* — Madelein Nguyen
(74) *Attorney, Agent, or Firm* — Banner & Witcoff, Ltd.

(57) ABSTRACT

An image processing apparatus including: a first housing; and a second housing, the second housing including: a base part; a supporting part; an image reader; and a detector, the first housing including: an image forming unit and a cover, wherein: the cover has a 1st region disposed on a lower position of the detector and a 2nd region disposed on an upper position of a moving range of a recording head; the 1st region has a recessed part recessed downward, an inner bottom surface of the recessed part being disposed at a position lower that an upper edge position of the 2nd region; the base part has a housing part; and a lower edge of the detector is lower than the upper edge position of the 2nd region.

11 Claims, 8 Drawing Sheets

(56) References Cited

U.S. PATENT DOCUMENTS

| | | | |
|---|---|---|---|
| 2008/0100882 A1* | 5/2008 | Ito | H04N 1/00543 358/475 |
| 2011/0223868 A1* | 9/2011 | Kojima | G07C 9/00309 455/67.11 |
| 2011/0292465 A1 | 12/2011 | Sugiyama et al. | |
| 2012/0044514 A1* | 2/2012 | Sugai | G03G 15/605 358/1.13 |
| 2012/0327146 A1* | 12/2012 | Mizuno | B41J 2/17513 347/7 |
| 2013/0135645 A1* | 5/2013 | Horiguchi | G06K 15/02 358/1.13 |
| 2013/0255989 A1* | 10/2013 | Ito | H02G 11/00 174/60 |
| 2013/0321882 A1* | 12/2013 | Horiguchi | H04N 1/00278 358/497 |
| 2014/0009799 A1* | 1/2014 | Miura | H04N 1/00551 358/474 |
| 2014/0064814 A1* | 3/2014 | Sato | G03G 15/234 399/388 |
| 2014/0071503 A1* | 3/2014 | Mukai | H04N 1/00604 358/498 |
| 2016/0150101 A1* | 5/2016 | Kikuta | H04N 1/0083 358/1.15 |
| 2017/0251120 A1* | 8/2017 | Nakashima | H04N 1/00559 |
| 2017/0251123 A1* | 8/2017 | Kawamata | H04N 1/1061 |
| 2017/0327331 A1* | 11/2017 | Nakashima | B65H 5/26 |

* cited by examiner

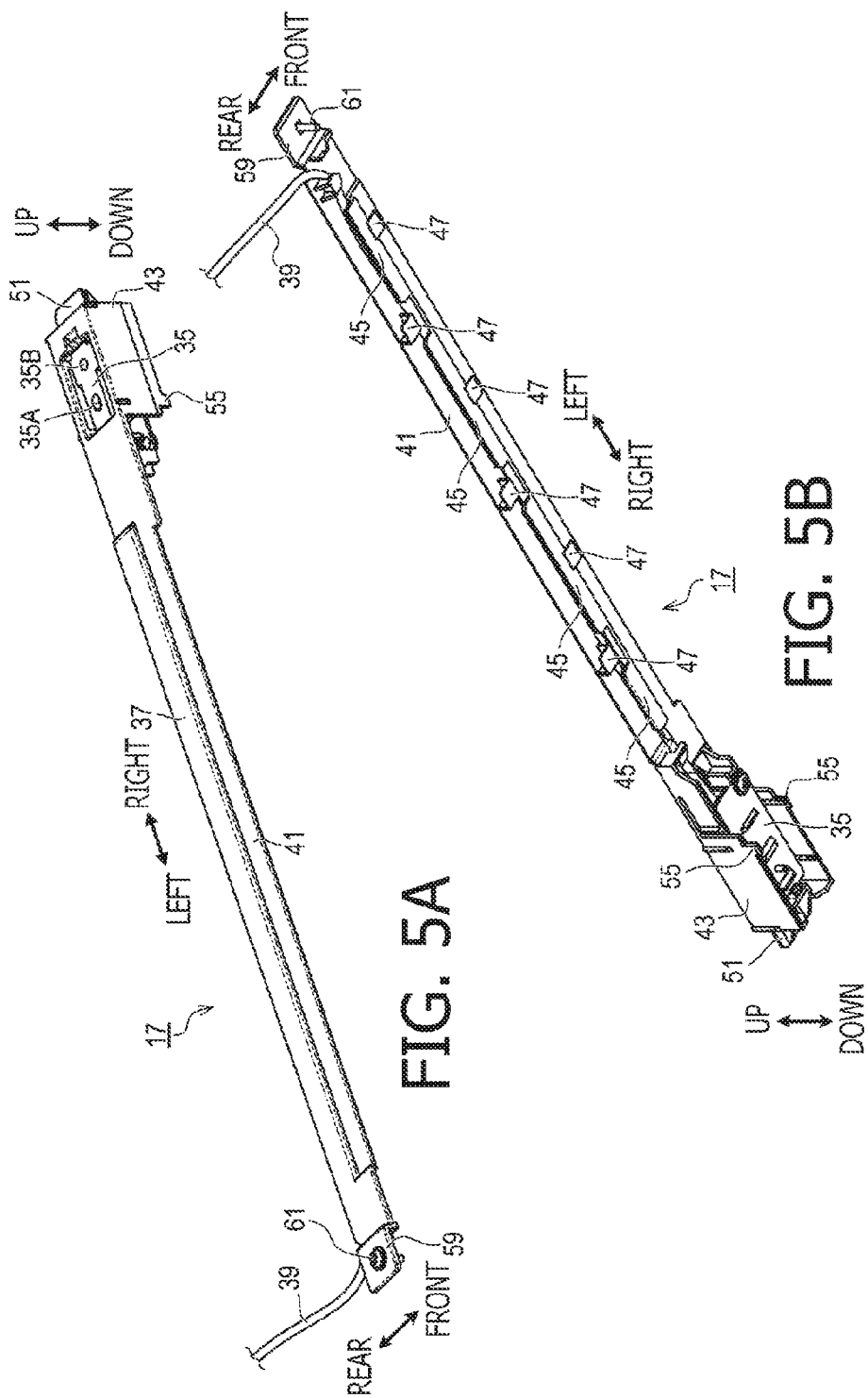

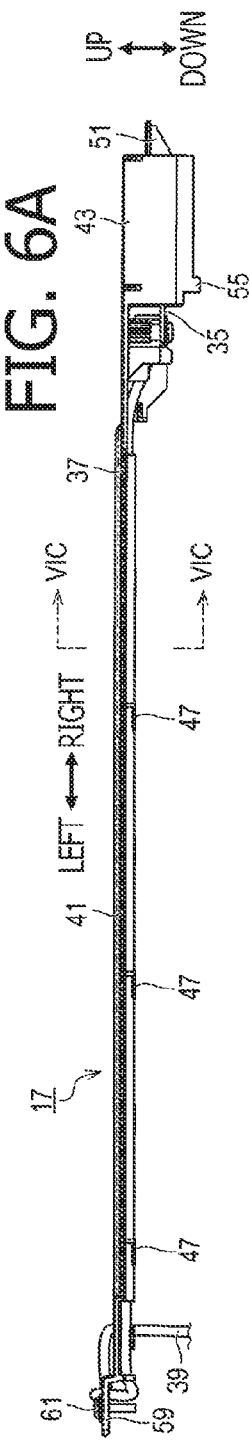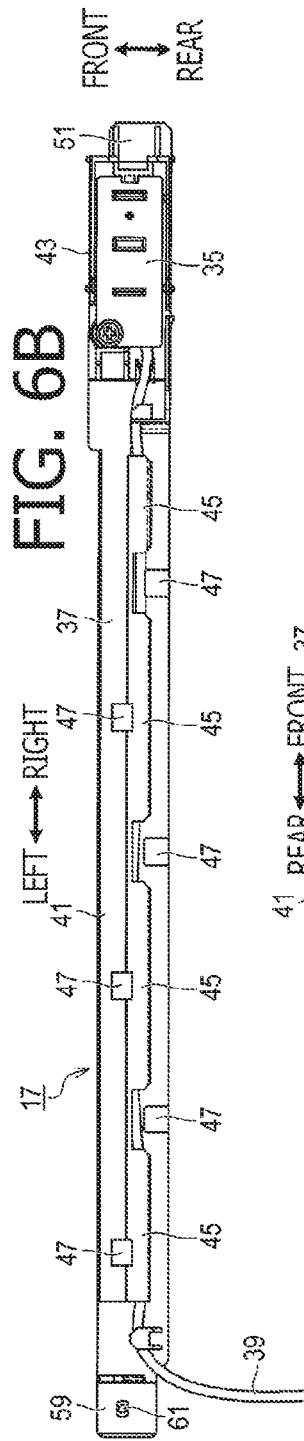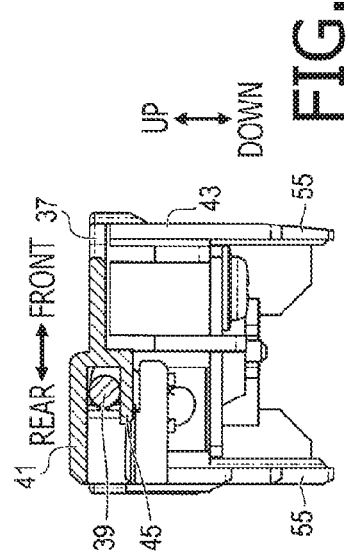

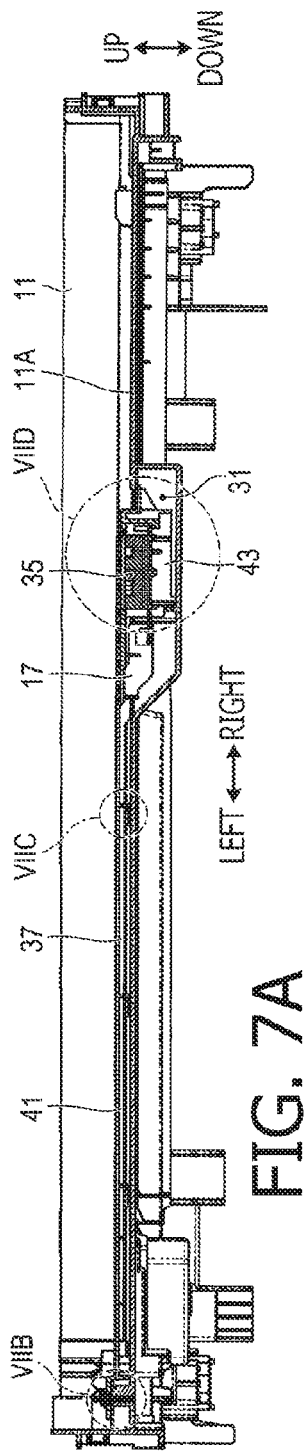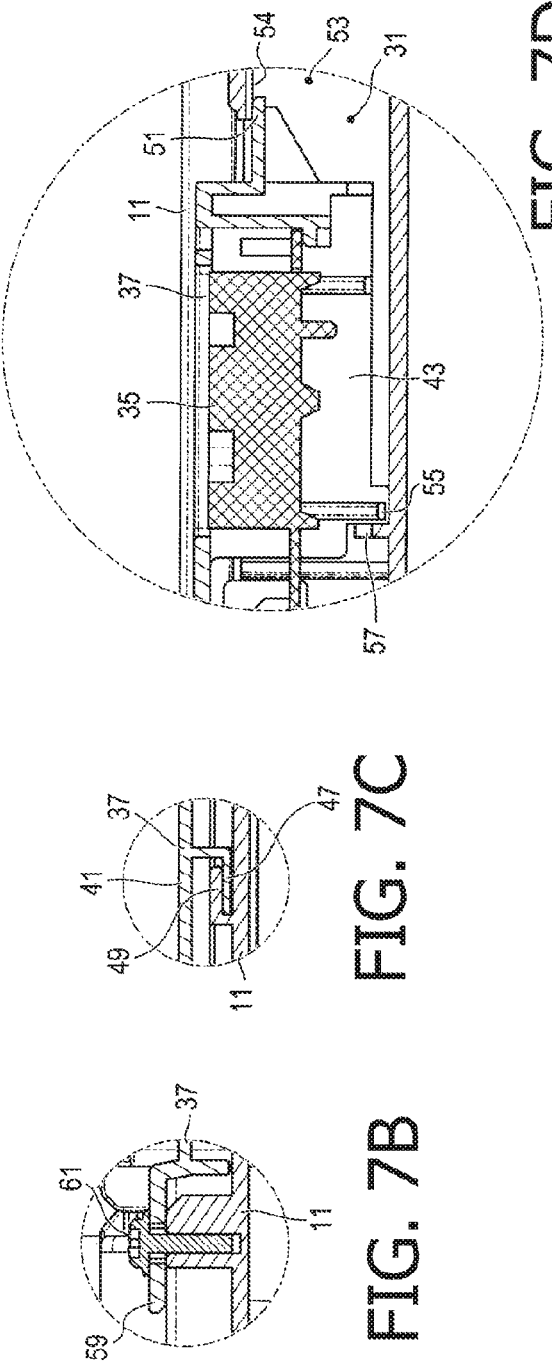

IMAGE PROCESSING APPARATUS

CROSS-REFERENCE TO RELATED APPLICATION

This application claims priority under 35 U.S.C. § 119 from Japanese Patent Application No. 2016-037244, filed on Feb. 29, 2016. The entire subject matter of the application is incorporated herein by reference.

BACKGROUND

Technical Field

Aspects of the present disclosures relate to an image processing apparatus.

Related Art

An image processing apparatus provided with a detection unit to detect a size of a document placed on a supporting part of the image processing apparatus is known. For example, in the image processing apparatus, the detection unit (a size sensor) is disposed, under the supporting part, at a position close to a peripheral part of the supporting part (a platen glass).

SUMMARY

In the image processing apparatus, a base part is opposed to the supporting part from a lower position to have a particular interval with respect to the supporting part, and the detection unit is housed in a space defined between the supporting part and the base part. However, when a designer wants to dispose the detection unit directly under a central portion of the supporting part, the detection unit is disposed at an upper position with respect to the base part and a moving space for a carriage mounting an image sensor is secured at an upper position with respect to the detection unit. Further, the supporting part is disposed at an upper position with respect to the moving space for the carriage. In this case, these components are stacked in a height direction. As a result, the size in the height direction of the whole apparatus is increased and thereby it becomes difficult to decrease the thickness of the apparatus.

Aspects of the present disclosures provide an image processing apparatus configured such that a configuration around a detection unit can be thinned regardless of the situation that the detection unit is disposed directly under a supporting part.

According to an aspect of the disclosures, there is image processing apparatus, comprising: a first housing; and a second housing provided at an upper position with respect to the first housing. The second housing comprises: a base part forming at least a bottom part of the second housing; a supporting part having a support surface supporting an object to be read, the supporting part being disposed to be spaced from an inner bottom surface of the base part; an image reader configured to read an image formed on the object to be read supported by the supporting part, the image reader being disposed between the supporting part and the inner bottom surface of the base part; and a detector configured to detect whether the object to be read exists at a detection target portion set in the support surface. The first housing comprises: an image forming unit having a recording head configured to form an image on a recording medium; and a cover forming an upper surface of the first housing, the cover being disposed at an upper position with respect to the image forming unit. The cover has, on an upper surface of the cover, a 1st region disposed at a lower position with respect to the detector and a 2nd region disposed at an upper position with respect to a moving range of the recording head. The 1st region has a recessed part formed to be recessed downward to a position lower than an upper edge position of the 2nd region, an inner bottom surface of the recessed part being disposed at a position lower that the upper edge position of the 2nd region. The base part has, on an upper surface of the base part, a housing part formed to be recessed downward to house the detector. The base part has, on a lower surface of the base part, a projected part formed to project downward at a portion corresponding to the housing part, the projected part being configured to be inserted into the recessed part provided on the upper surface of the cover. A lower edge of the detector housed in the housing part is disposed at a position lower than the upper edge position of the 2nd region of the cover.

BRIEF DESCRIPTION OF THE ACCOMPANYING DRAWINGS

FIG. 5A is a perspective view of the detecting part viewed from the upper left side.

FIG. 5B is a perspective view of the detecting part viewed from the lower left side.

FIG. 6A is a front view of the detecting part.

FIG. 6B is a bottom view of the detecting part.

FIG. 6C is an enlarged cross sectional view at a cut portion indicated by a line VIC-VIC in FIG. 6A.

FIG. 7A is a cross sectional view at a cut portion indicated by a line VIIA-VIIA in FIG. 2.

FIG. 7B is an enlarged view at a portion VIIB shown in FIG. 7A.

FIG. 7C is an enlarged view at a portion VIIC shown in FIG. 7A.

FIG. 7D is an enlarged view at a portion VIID shown in FIG. 7A.

DETAILED DESCRIPTION

Hereafter, an image processing apparatus according to an illustrative embodiment is described with reference to the accompanying drawings.

(Configuration of a Multifunction Apparatus)

Figure 1:
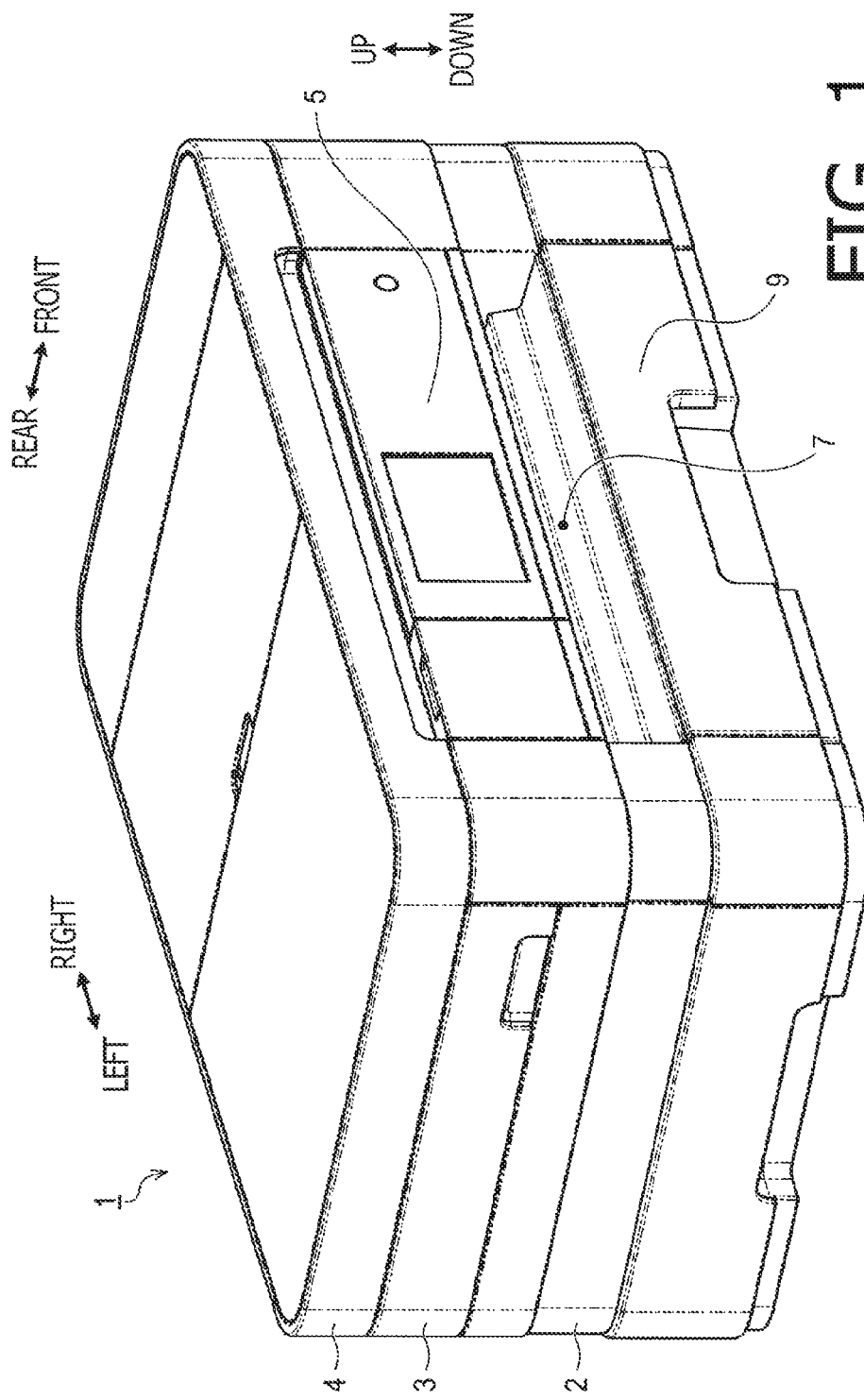
FIG. 1 is a perspective view illustrating an outer appearance of a multifunction apparatus according to an illustrative embodiment.

A multifunction apparatus 1 shown in FIG. 1 is an example of an image processing apparatus. The multifunction apparatus 1 includes a body unit 2, a reading unit 3, and an automatic document feeder 4. In the following, the automatic document feeder 4 is referred to as ADF unit 4. The body unit 2 is provided with an operation panel 5. In the following explanation, a direction perpendicularly intersecting with a horizontal surface in a state where the multifunction apparatus 1 is placed on the horizontal surface is defined as an up and down direction. Further, in a state where the multifunction apparatus 1 is placed on the horizontal surface, a side on which the operation panel 5 is provided is defined as a front side, an opposite side of the front side is defined as a rear side. In a state where the multifunction apparatus is viewed from the front side, a side to which a left surface of the multifunction apparatus 1 points is defined as a left side, and a side to which a right surface of the multifunction apparatus 1 points is defined as a right side. It is noted that, however, these definitions are merely defined to explain the relative positional relationship between components constituting the multifunction apparatus 1. Therefore, when the multifunction apparatus 1 is installed, the multifunction apparatus 1 may be arbitrarily oriented.

The reading unit 3 is arranged on the body unit 2. The reading unit 3 is attached to the body unit 2 to be openable and closable with respect to the body unit 2. In a state where the reading unit 3 is closed, a top surface of the body unit 2 is covered with the reading unit 3. In a state where the reading unit 3 is opened, a maintenance operation can be conducted for an internal structure of the body unit 2 from the top surface of the body unit 2. The ADF unit 4 is arranged on the reading unit 3. The ADF unit 3 is attached to the reading unit 3 to be openable and closable with respect to the reading unit 3. In a state where the ADF unit 4 is closed, the ADF unit 4 functions as a document cover covering the top surface of the reading unit 3.

The operation panel 5 has an inputting device (e.g., a touch panel, various types of buttons, switches and the like) for allowing a user to input various instructions to the multifunction apparatus 1, and an outputting device for letting a user know an operation status of the multifunction apparatus 1. Under the operation panel 5, an outlet port 7 for picking up a recording medium on which an image has been formed by an image forming unit is provided. Under the outlet port 7, a medium supply cassette 9 in which recording media to be supplied to the image forming unit are accommodated is attached.

Figure 2:
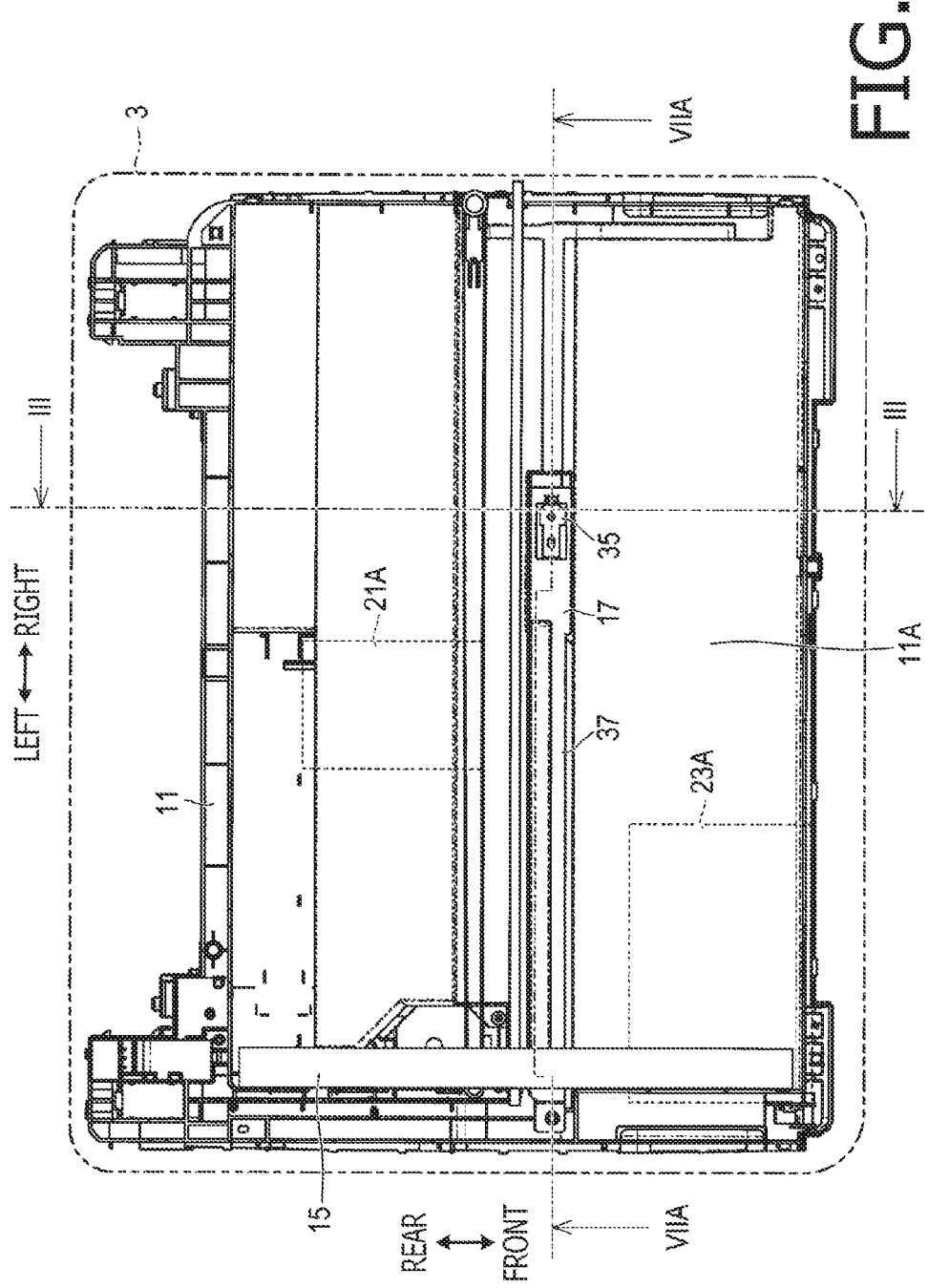
FIG. 2 is illustrates, as a plan view, a positional relationship between a base part, a detecting part, a reading part, a control unit and a recording head, according to the illustrative embodiment.
Figure 3:
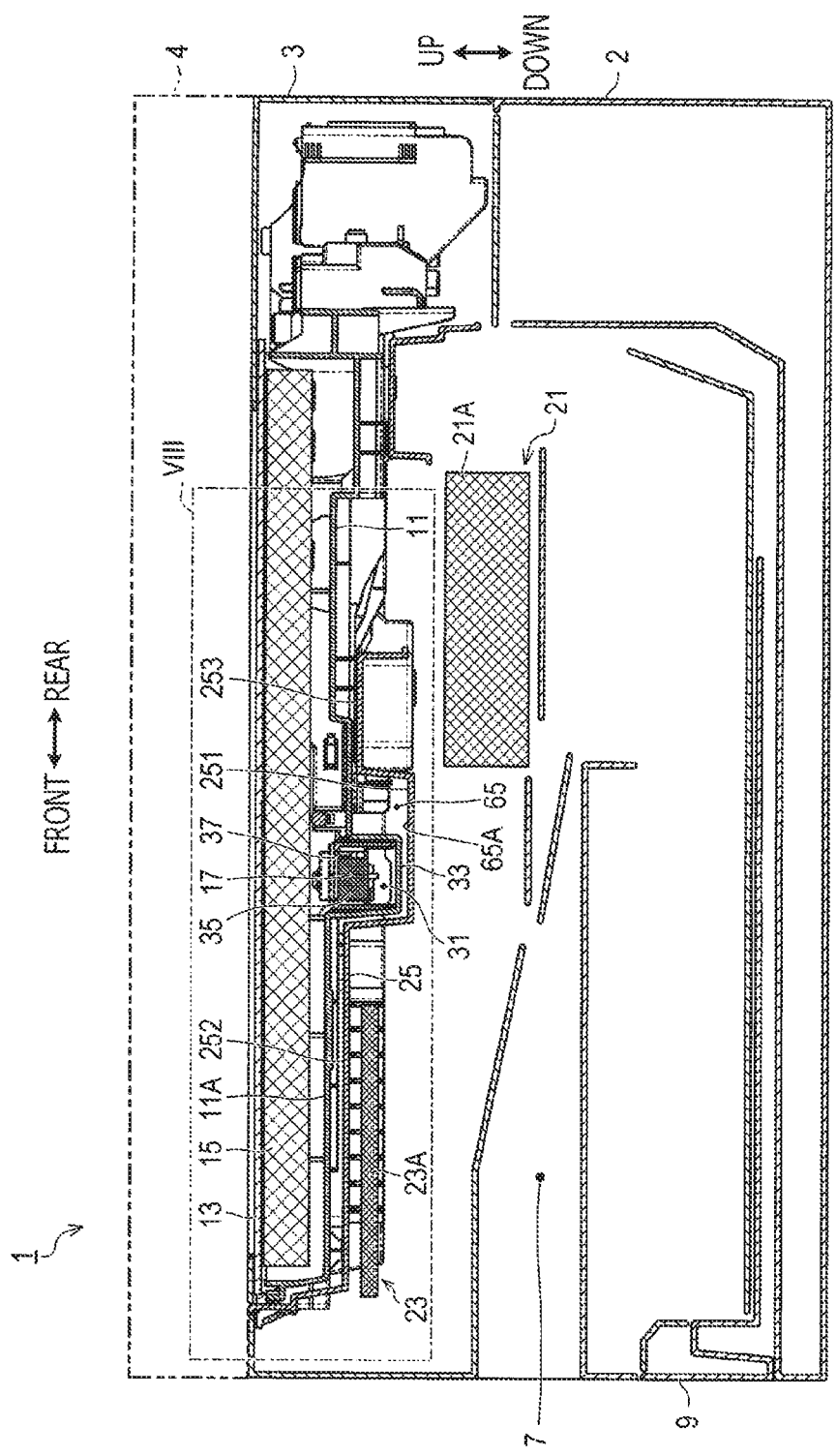
FIG. 3 illustrates, as a cross sectional view along a cutting plane indicated by a line III-III in FIG. 2, a positional relationship between the base part, a cover, the detecting part, the reading part, the control unit and the recording head, according to the illustrative embodiment.

As shown in FIGS. 2 and 3, the reading unit 3 includes a base part 11, a supporting part 13, a reading part 15 and a detecting part 17. The body unit 2 includes the image forming unit 21, a control unit 23 and a cover 25. The base part 11 is a molded article made of resin which forms at least a bottom part of the reading unit 3. On an inner bottom surface 11A of the base part 11, a housing part 31 formed to be recessed downward is provided. In the housing part 31, the detecting unit 17 is housed. More specifically, a sensor holding part 43 of the detecting part 17 is housed in a recession of the housing part 31. At a position corresponding to the housing part 31 on a lower surface of the base part 11, a projected part 33 is formed to project downward. As shown, for example, in FIGS. 3 and 7, the inner bottom surface 11A of the base part 11 is formed to generally expand horizontally while having slight irregularities. A portion of the inner bottom surface 11A at which the housing part 31 is provided is recessed largely downward with respect to the other part of the inner bottom surface 11A.

Figure 4:
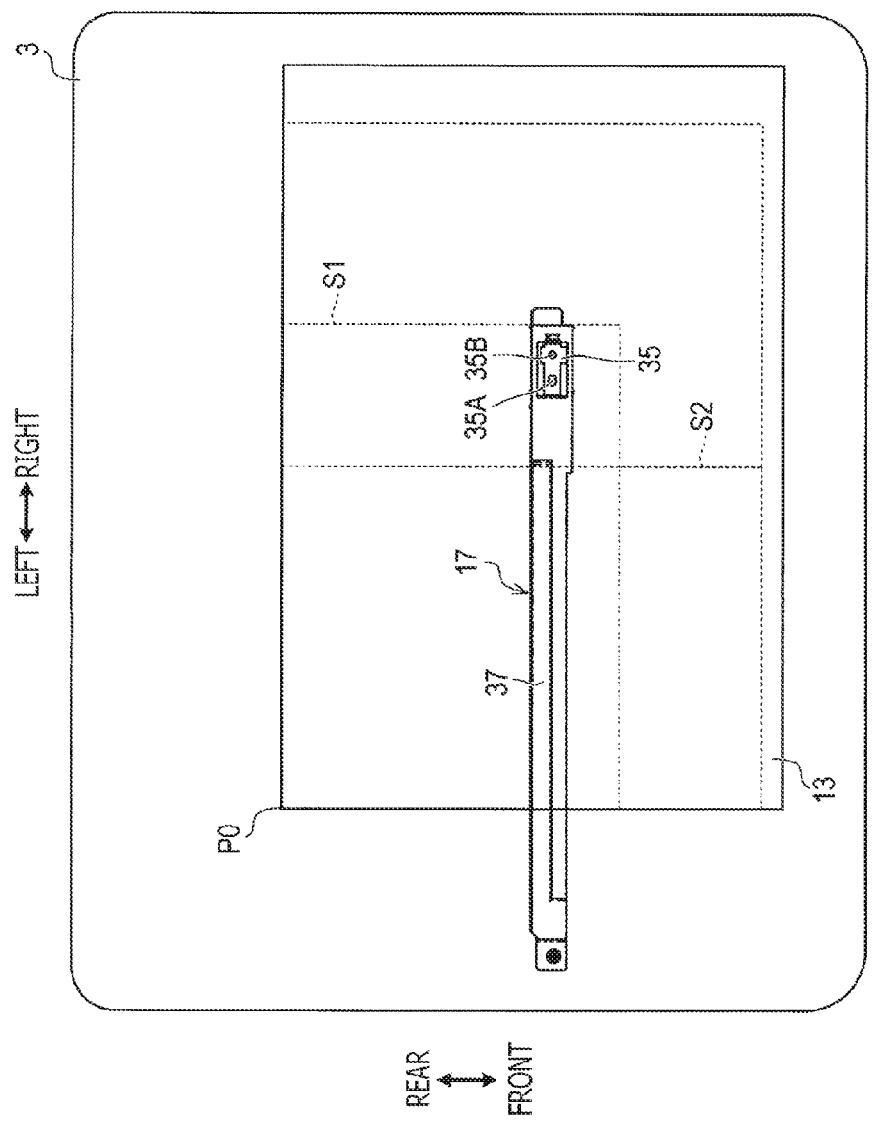
FIG. 4 illustrates, as a plan view, a positional relationship between the detecting part, a platen, and objects to be read having different sizes, according to the illustrative embodiment.

As shown in FIG. 3, the supporting part 13 is disposed to be spaced from the inner bottom surface 11A of the base part 11. A top surface of the supporting part 13 is used as a support surface for an object to be read. As shown in FIG. 4, the supporting part 13 is formed to have a rectangular shape when viewed from above, and a position of one (a rearward left corner in FIG. 4) of four corners of the rectangular shape of the supporting part 13 is defined as an origin position P0. The origin position P0 is used as a reference point when an object to be read placed on the supporting part 13 is positioned with respect to the supporting part 13.

As shown in FIG. 3, the reading part 15 is provided between the supporting part 13 and the inner bottom surface 11A of the base part 11. The reading part 15 is configured to read an image formed on an object to be read supported by the supporting part 13. More specifically, in the reading part 15, an image sensor (a CIS (Contact Image Sensor) in the illustrative embodiment) having a plurality of reading elements arranged in a main scanning direction (a front and rear direction in FIG. 2) is provided. The image sensor is mounted on a carriage which is capable of reciprocating in an auxiliary scanning direction (a left and right direction in FIG. 2). With this configuration, the reading part 15 is able to read an image formed on an object to be read while letting the plurality of reading elements arranged in the mains canning direction move in the auxiliary scanning direction.

As shown in FIGS. 4, 5A and 5B, the detecting part 17 includes a reflection type optical sensor 35 and a holder 37 which holds the optical sensor 35. The optical sensor 35 includes a light projecting device 35A and a light receiving device 35B, and is configured to project light from the light projecting device 35A to an object to be read and to received light reflected from the object to be read with the light receiving device 35B. To the optical sensor 35, an end of a cable 39 is connected. The holder 37 includes a cable holding part 41 which holds the cable 39, and a sensor holding part 43 which holds the optical sensor 35. The holder 37 is configured such that the cable holding part 41 is formed to extend in one direction and that the sensor holding part 43 is attached to one end of the holder 37 in the longer direction. In this illustrative embodiment, the holder 37 is attached to the inner bottom surface 11A of the base part 11 to extend in the left and right direction. The sensor holding part 43 is provided at the right end part of the holder 37. The cable holding part 41 is provided to extend leftward from the left end of the sensor holding part 43.

As shown in FIGS. 5B, 6B and 6C, a plurality of (four in this illustrative embodiment) claw parts 45 are provided on the cable holding part 41. Each claw part 45 is provided to face the inner bottom surface 11A in a state where the cable holding part 41 is attached to the base part 11. As shown in FIG. 6C, at a portion where the claw part 45 is provided, the cross sectional shape of the cable holding part 41 is formed such that, of four sides constituting a square shape, three sides are covered with walls and the remaining side is opened. In this configuration, the cable 39 is hooked to the cable holding part 41 through the opened side. As a result, the claw parts 45 serves to prevent the cable 39 from coming off the cable holding part 41. As shown in FIGS. 5B, 6B, 7A and 7C, a plurality of (six in this illustrative embodiment) restricting parts 47 are provided on the cable holding part 41. Each restricting part 47 is provided to face the inner bottom surface 11A in a state where the cable holding apart 41 is attached to the base part 11. On the other hand, on the inner bottom surface 11A of the base part 11, catching parts 49 are formed at a plurality of positions to project toward the supporting part 13. When the detecting part 17 is attached to the base part 11, each restricting part 47 is hooked to the catching part 49 of the base part 11 as shown in FIG. 7C. As a result, each restricting part 47 prevents the cable holding part 41 from deviating in a direction departing from the inner bottom surface 11A of the base part 11.

Of the plurality of restricting parts 47, some (three in this illustrative embodiment) restricting parts 47 are positioned to be able to contact the cable 39. As a result, when the cable 39 is deviated to approach the restricting parts 47, the restricting parts 47 contact the cable 37 and thereby the restricting parts 47 also restricts deviation of the cable 39 toward the opposite side of the cable 39 with respect to the restricting part 47 (toward the rear side with respect to the restricting part 47 in this illustrative embodiment).

As shown in FIGS. 5A, 5B, 6A, 6B, 7A and 7D, the holder 37 has an insertion part 51 at an end of the holder 37 where the sensor holding part 43 is provided. The insertion part 51 is formed to further extend rightward from the right end of the sensor holding part 43. As shown in FIG. 7D, the insertion part 51 is inserted into a catching part 53 formed on the inner bottom surface 11A of the base part 11 when the detecting part 17 is attached to the base part 11. The catching part 53 is formed at a right end portion of the housing part 31 to be recessed rightward. In a state where the sensor holding part 43 is housed in the housing part 31, the catching part 53 contacts the insertion part 51 with a ceiling surface 54 which faces the insertion part 51 from above, and restricts deviation of the insertion part 51 toward an upper position. Further, on the sensor holding part 43, a positioning part 55 is provided. On the other hand, on a bottom surface of the housing part 31, a contact part 57 is provided to project toward the sensor holding part 43. When the detecting part 17 is attached to the base part 11, the insertion part 51 is inserted into the catching part 53 and thereafter the detecting part 17 is shifted leftward in FIG. 7D. As a result, the positioning part 55 contacts the contact part 57 formed on the bottom surface of the housing part 31, and thereby the relative position of the detecting part 17 with respect to the base part 11 is determined.

As shown in FIGS. 5A, 5B, 6B, 7A and 7B, on an end of the holder 37 on the opposite side of the other end at which the sensor holding part 43 is provided, a screw fastening part 59 which is screwed to the baser part 11 is provided. When the detecting part 17 is attached to the base part 11, the insertion part 51 is inserted into the catching part 53 and the relative position of the detecting part 17 with respect to the base part 11 is determined by the positioning part 55. Thereafter, the screw fastening part 59 of the detecting part 17 is screwed to the base part 11. As a result, it becomes possible to attach the holder 37 to the base part 11 only by tightening one screw 61. After the holder 37 is thus attached to the base part 11, the cable 39 is disposed at a position which is on the upper side of the base part 11 and is covered with the cable holding part 41.

The detecting part 17 configured as described above is able to detect whether an object to be read exists at a detection target portion which is at an upper position with respect to the optical sensor 35. As shown in FIG. 4, in this illustrative embodiment, the detection target portion by the optical sensor 35 is within an overlapping portion between a range (a range S1 in FIG. 4) in which an object to be read having A4 size placed on the supporting part 13 in a landscape orientation overlaps with the supporting part 13 and a range (a range other than a range S2 in FIG. 4) in which an object to be read having A4 size placed on the supporting part 13 in a portrait orientation does not overlap with the supporting part 13. The landscape orientation means that an object to be read is placed on the supporting part 13 such that the longer side of the object to be read is oriented in the auxiliary scanning direction and a corner of the object to be read is positioned to coincide with the origin position P0. The portrait orientation means that an object to be read is placed on the supporting part 13 such that the longer side of the object to be read is oriented in the main scanning direction and a corner of the object to be read is positioned to coincide with the origin position P0.

As shown in FIGS. 2 and 3, the image forming unit 21 has a recording head 21A which forms an image on an object to be read. In this illustrative embodiment, the recording head 21A is configured to be able to form an image in an inkjet printing manner on an object to be read. The image forming unit 21 further includes a driving mechanism which drives the recording head 21A to make a reciprocating motion, an ink supplying mechanism which supplies ink to the recording head 21A, etc.; however, since these components are known in the art regarding an inkjet type image forming apparatus, illustrations thereof are omitted. The control unit 23 has an electronic circuit board 23A, and is configured to control the reading part 15 and the image forming unit 21 by a micro controller mounted on the electronic circuit board 23A. One end of the cable 39 of which the other end is connected to the optical sensor 35 is connected to the electronic circuit board 23A.

The cover 25 is a molded article made of resin which covers at least an upper surface of the body unit 2, and is disposed at an upper position with respect to the image forming unit 21 and the control unit 23. On an upper surface of the cover 25, a first region 251 which is disposed at a lower position with respect to the detecting part 17, a second region 252 which is disposed at an upper position with respect to the control unit 23 and a third region 253 which is disposed at an upper position with respect to a moving range of the recording head 21A are provided. That is, in the front and rear direction, the first region 251 is disposed between the second region 252 and the third region 253. At least in a part of the first region 251, a recessed part 65 is formed to be recessed downward. The projected part 33 formed on the lower surface of the base part 11 is configured to enter into the recessed part 65 formed on the upper surface of the cover 25.

Figure 8:
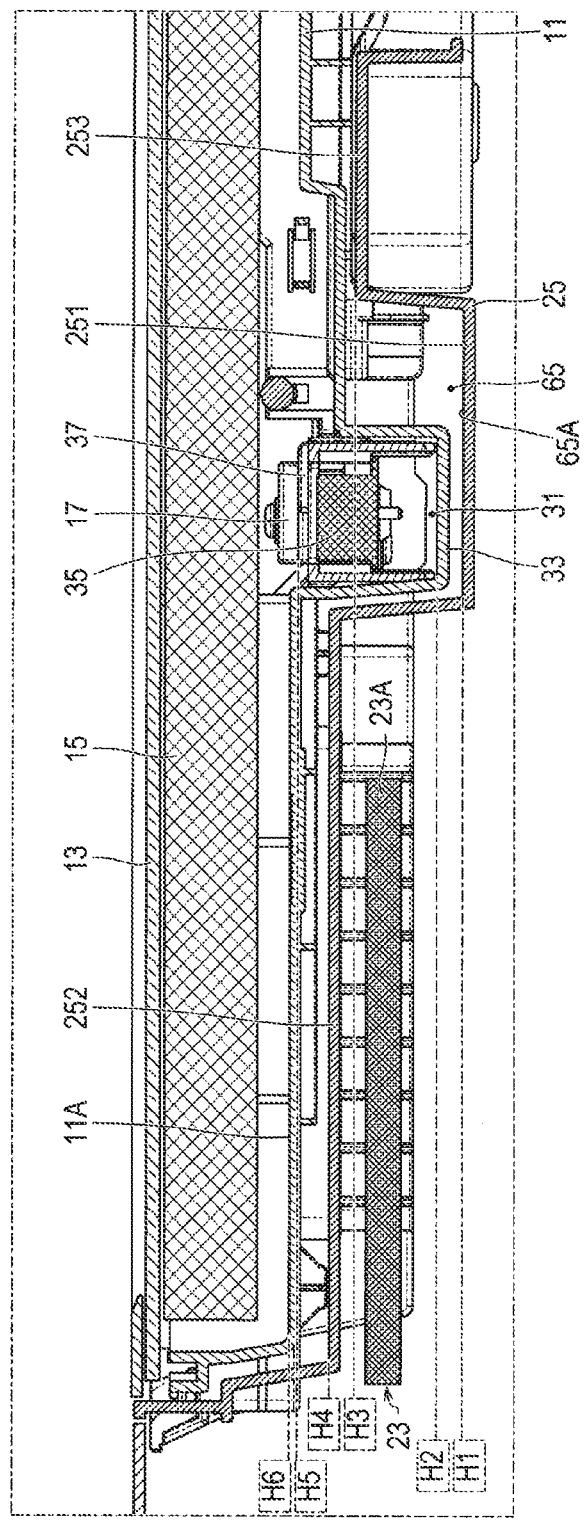
FIG. 8 is an enlarged view at a portion VIII shown in FIG. 3.

As shown in FIG. 8, an inner bottom surface 65A of the recessed part 65 in the first region 251 is positioned at a position H1 in the height direction. A lower edge of the holder 37 of the detecting part 17 is positioned at a position H2 in the height direction. An upper edge of the third region 253 is positioned at a position H3 in the height direction. An upper edge of the second region 252 is positioned at a position H4 in the height direction. An upper edge of a part of the holder 37 disposed on a lower side of a moving range of the reading part 15 is positioned at a position H5 in the height direction. A part of the inner bottom surface 11A of the base part 11 disposed on an upper side of the second region 252 is positioned at a position H6 in the height direction.

Therefore, the height position H1 of the inner bottom surface 65A of the recessed part 65 is lower than the position H4 of the upper edge of the second region 252 of the cover 25 and the position H3 of the upper edge of the third region 253 of the cover 25. The height position H2 of the lower edge of the detecting part 17 housed in the housing part 31 is lower than the position H4 of the upper edge of the second region 252 of the cover 25 and the position H3 of the upper edge of the third region 253 of the cover 25. More specifically, the detecting part 17 is disposed such that the height position H2 of the lower edge of the holder 37 is lower than the position H4 of the upper edge of the second region 252 of the cover 25 and the position H3 of the upper edge of the third region 253 of the cover 25. Furthermore, the position H5 of the upper edge of a part of the holder 37 disposed on a lower side with respect to the moving range of the reading part 15 is lower than the height position H6 of a part of the inner bottom surface 11A of the base part 11 disposed on an upper side with respect to the second region 252.

According to the multifunction apparatus configured as described above, the lower edge of the detecting part 17 is positioned at the position H2 which is lower than the position H4 of the upper edge of the second region 252 on the upper surface of the cover 25 and the position H3 of the upper edge of the third region 253 on the upper surface of the cover 25. Therefore, in comparison with the case where the detecting part 17 is disposed at a position higher than the position of the upper edge of the cover 25 (the position H4 of the upper edge of the second region 252 in this illustrative embodiment), the size in a height direction of an apparatus can be decreased and thereby the apparatus can be thinned.

In this illustrative embodiment, the position H5 of the upper edge of a part of the holder 37 disposed on a lower side with respect to the moving range of the reading part 15 is lower than the height position H6 of a part of the inner bottom surface 11A of the base part 11 disposed on an upper side with respect to the second region 252. Therefore, it becomes possible to prevent the reading part 15, which operates at a position higher than the part of the inner bottom surface 11A of the base part 11 disposed on an upper side with respect to the second region 252, from contacting the holder 37.

In this illustrative embodiment, the relative position of the detecting part 17 with respect to the base part 11 can be positioned by utilizing the positioning part 55 formed on the lower surface of the sensor holding part 43 of the holder 37. Therefore, the detecting part 17 can be precisely attached to the base part 11 at a designed position.

Furthermore, in this illustrative embodiment, the holder 37 includes the cable holding part 41 which holds the cable 39, and the sensor holding part 43 which holds the optical sensor 35. The cable 39 is disposed at the position which is on the upper side with respect to the base part 11 and at which the cable 39 is covered with the cable holding part 41. Therefore, the cable 39 can be wired at a designed position, and thereby it becomes possible to prevent the cable 39 disposed as described above from lifting up.

In this illustrative embodiment, the claw parts 45 are provided for the cable holding part 41, and the cable 39 is hooked to the claw parts 45 so that the cable 39 is hard to come off the cable holding part 41. Therefore, the cable 39 can be easily handled, for example, during assembling work.

In this illustrative embodiment, the restricting parts 47 are provided for the cable holding part 41, and the cable holding part 41 can be prevented from departing from the base part 11 by hooking the restricting parts 47 to the catching parts 49 formed on the base part 11. Therefore, it becomes possible to prevent the cable holding part 41 from lifting up from the base part 11.

In this illustrative embodiment, some of the restricting parts 47 additionally restricts deviation of the cable 39. Therefore, the restricting parts 47 and the claw parts 45 cooperatively make the cable 39 hard to come off the cable holding part 41.

In this illustrative embodiment, the holder 37 is provided with the insertion part 51 and the screw fastening part 59 as described above. Therefore, the holder 37 can be attached to the base part 11 through simple work of inserting the insertion part 51 into the catching part 53 formed on the base part 11 and then screwing the screw fastening part 59 to the base part 11.

In this illustrative embodiment, it can be assumed that the fact that existence of an object to be read is detected by the detecting part 17 corresponds to the case where the object to be read has A4 size and the longer side of the object to be read is oriented to coincide with the auxiliary scanning direction (hereafter, also referred to as the case of A4 landscape orientation) or the case where the object to be read has A3 size (hereafter, also referred to as the case of A3 landscape orientation). Furthermore, it can be assumed that the fact that existence of an object to be read is not detected by the detecting part 17 corresponds to the case where the object to be read has A4 size and the longer side of the object to be read is oriented to coincide with the main scanning direction (hereafter, also referred to as the case of A4 portrait orientation). Whether the object to be read has A4 size or A3 size can be determined by starting reading of an image of the object to be read by the reading part 15. Therefore, by disposing the detecting part 17 as described above, it becomes possible to appropriately discriminate between the case of A4 landscape orientation, the case of A3 landscape orientation and the case of A4 portrait orientation, while taking into account the reading result by the reading part 15.

In the foregoing, explanations about an image processing apparatus have been given using an illustrative embodiment. It should be understood that, however, the above described illustrative embodiment is merely an example of the present disclosure. That is, the present disclosure is not limited to the above described illustrative embodiment, and can be embodied in various ways without departing from the scope of the present disclosure.

For example, in the above described illustrative embodiment, the detecting part 17 is formed of the optical sensor 35 and the holder 37, and the holder 37 is a separate component which is separately provided from the base part 11. However, a structure corresponding to the holder 37 may be integrally provided for the base part 11, and the optical sensor 35 may be embedded in the structure integrally provided for the base part 11. In this case, structures such as the positioning part 55 can be omitted.

In the above described illustrative embodiment, the holder 37 is configured to be attached to the base part 11 using the insertion part 51 and the screw fastening part 59. However, the holder 37 may be configured to be attached to the base part 11 with another type of attaching structure known in the art.

It is understood that, in the above described embodiment, a particular function performed by one component may be performed cooperatively by two or more components. A plurality of functions respectively performed by a plurality of components in the above described illustrative embodiment or a particular function performed cooperatively by a plurality of components in the above described illustrative embodiment may be performed by one component. A part of the configuration of the above described illustrative embodiment may be omitted. At least a part of the configuration of the above described illustrative embodiment may be added to or replaced with a part of another embodiment. In addition to the above described illustrative embodiment, the present disclosure may be implemented in various ways, such as a system including, as a component, the above described image processing apparatus.

As clearly understood from the above described illustrative embodiment, the image processing apparatus according to the present disclosure may has the following configurations.

In the image processing apparatus according to the present disclosure, the detecting part may comprises: a reflection type optical sensor having a light projecting device projecting light toward the object to be read and a light receiving device receiving light reflected from the object to be read; and a holder that holds the reflection type optical sensor. The detecting part housed in the housing part may be disposed such that a lower edge of the holder is at a position lower than the upper edge position of the second region and the upper edge position of the third region.

In the image processing apparatus according to the present disclosure, an upper edge position of a part of the holder disposed on a lower side with respect to a moving range of the reading part may be provided at a position lower than a part of the inner bottom surface of the base part disposed on an upper side of the second region.

According to the image processing apparatus configured as described above, under the moving range of the reading part, the upper edge position of a part of the holder is provided at a position lower than a part of the inner bottom surface of the base part disposed on an upper side of the second region. Therefore, it becomes possible to prevent the reading part, operating at a position higher than the part of the inner bottom surface of the base part disposed on the upper side of the second region, from contacting the holder.

In the image processing apparatus according to the present disclosure, the housing part of the base part may have a positioning part formed to determine a relative position of the detecting part with respect to the base part.

According to the image processing apparatus configured as described above, the relative position of the detecting part with respect to the base part can be determined through use of the positioning part. Therefore, when the detecting part is attached to the base part, the detecting part can be precisely attached to a designed position.

The image processing apparatus according to the present disclosure may further comprise a cable having one end connected to the reflection type optical sensor and the other end connected to the electronic circuit board. The holder may comprise a cable holding part holding the cable and a sensor holding part holding the reflection type optical sensor. The cable may be disposed at a position between the cable holding part and the base.

According to the image processing apparatus configured as described above, the cable can be wired at a designed position, and thereby it becomes possible to prevent the cable thus wired from lifting up.

In the image processing apparatus according to the present disclosure, the cable holding part may have a claw part formed to let the cable be hooked to the claw part and thereby to prevent the cable coming off the cable holding part.

According to the image processing apparatus configured as described above, since the cable is hooked to the claw part, the cable is hard to come off the cable holding part. Therefore, the cable can be easily handled, for example, during assembling work.

In the image processing apparatus according to the present disclosure, the cable holding part may have a restricting part formed to be hooked to the base part and thereby to restrict deviation of the cable holding part in a direction departing from the base part.

According to the image processing apparatus configured as described above, it is possible to prevent the cable holding part from departing from the base part, by letting the restricting part be hooked to the base part. As a result, it becomes possible to prevent the cable holding part from lifting up from the base part.

In the image processing apparatus according to the present disclosure, the restricting part may be formed to further restrict deviation of the cable toward a position on an opposite side of the cable with respect to the restricting part, by contacting the cable.

According to the image processing apparatus configured as described above, the restricting part further restricts deviation of the cable. Therefore, through cooperation between the restricting part and the claw part, the cable is made hard to come off the cable holding part.

In the image processing apparatus according to the present disclosure, the holder may be configured such that the cable holding part is formed to extend in one direction and the sensor holding part is provided at one end in a longer direction of an extended shape of the cable holding part. The holder may have an insertion part at an end at which the sensor holding part is provided, and a screw fastening part at an opposite end of the end at which the sensor holding part is provided. The insertion part is inserted into a catching part of the base part, and the screw fastening part is screwed to the base part. The holder may be attached to the base part by inserting the insertion part into the catching part and then screwing the screw fastening part to the base part.

According to the image processing apparatus configured as described above, the holder can be attached to the base part through simple work of inserting the insertion part into the catching part and then screwing the screw fastening part to the base part.

In the image processing apparatus according to the present disclosure, the supporting part may be formed in a rectangular shape when viewed from above, and an origin position may be defined at one of four corners of the rectangular shape of the supporting part. The reading part may have a plurality of reading elements arranged in a main scanning direction. The reading part may be configured to read an image formed on the object to be read while moving the plurality of reading elements in an auxiliary scanning direction. The detecting part may be disposed to detect existence of the object to be read having A4 size when the object to be read having A4 size is supported on the supporting part in a state where a longer side of the object to be read having A4 size is oriented to coincide with the auxiliary scanning direction and a corner of the object to be read is positioned at the origin position, and not to detect existence of the object to be read having A4 size when the object to be read having A4 size is supported on the supporting part in a state where the longer side of the object to be read having A4 size is oriented to coincide with the main scanning direction and a corner of the object to be read having A4 size is positioned at the origin position.

According to the image processing apparatus configured as described above, when existence of the object to be read is detected, it can be assumed that the fact that existence of an object to be read is detected by the detecting part corresponds to the case where the object to be read has A4 size and the longer side of the object to be read is oriented to coincide with the auxiliary scanning direction (hereafter, also referred to as the case of A4 landscape orientation) or the case where the object to be read has A3 size (hereafter, also referred to as the case of A3 landscape orientation). Furthermore, it can be assumed that the fact that existence of an object to be read is not detected by the detecting part corresponds to the case where the object to be read has A4 size and the longer side of the object to be read is oriented to coincide with the main scanning direction (hereafter, also referred to as the case of A4 portrait orientation). Whether the object to be read has A4 size or A3 size can be determined by starting reading of an image of the object to be read by the reading part. Therefore, by disposing the detecting part as described above, it becomes possible to appropriately discriminate between the case of A4 landscape orientation, the case of A3 landscape orientation and the case of A4 portrait orientation, while taking into account the reading result by the reading part.

What is claimed is:

1. An image processing apparatus, comprising:
a first housing; and
a second housing provided at an upper position with respect to the first housing,
the second housing comprising:
a base part forming at least a bottom part of the second housing;
a supporting part having a support surface supporting an object to be read, the supporting part being disposed to be spaced from an inner bottom surface of the base part;
an image reader configured to read an image formed on the object to be read supported by the supporting part, the image reader being disposed between the supporting part and the inner bottom surface of the base part; and
a detector configured to detect whether the object to be read exists at a detection target portion set in the support surface,
the first housing comprising:
an image forming unit having a recording head configured to form an image on a recording medium; and
a cover forming an upper surface of the first housing, the cover being disposed at an upper position with respect to the image forming unit,
wherein:
the cover has, on an upper surface of the cover, a 1st region disposed at a lower position with respect to the detector and a 2nd region disposed at an upper position with respect to a moving range of the recording head;
the 1st region has a recessed part formed to be recessed downward to a position lower than an upper edge position of the 2nd region, an inner bottom surface of the recessed part being disposed at a position lower than the upper edge position of the 2nd region;
the base part has, on an upper surface of the base part, a housing part formed to be recessed downward to house the detector;
the base part has, on a lower surface of the base part, a projected part formed to project downward at a portion corresponding to the housing part, the projected part being configured to be inserted into the recessed part provided on the upper surface of the cover; and
a lower edge of the detector housed in the housing part is disposed at a position lower than the upper edge position of the 2nd region of the cover.

2. The image processing apparatus according to claim 1, wherein:
the first housing further comprises a control unit configured to control the image reader and the image forming unit, the control unit having an electronic circuit board;
the cover is disposed on an upper position with respect to the control unit;
the cover further has, on the upper surface of the cover, a 3rd region disposed on an upper position with respect to the control unit;
the recessed part of the 1st region is formed to be recessed to the position lower than an upper edge position of the 3rd region;

the inner bottom surface of the recessed part of the 1st region is disposed to be lower than the upper edge position of the 3rd region; and
the lower edge of the detector is disposed to be lower than the upper edge position of the 3rd region.

3. The image processing apparatus according to claim 2, wherein the detector comprises:
a reflection type optical sensor having a light projecting device projecting light toward the object to be read and a light receiving device receiving light reflected from the object to be read; and
a holder that holds the reflection type optical sensor, and
wherein the detector housed in the housing part is disposed such that a lower edge of the holder is at a position lower than the upper edge position of the 3rd region and the upper edge position of the 2nd region.

4. The image processing apparatus according to claim 3, wherein an upper edge position of a part of the holder disposed at a lower position with respect to a moving range of the image reader is provided at a position lower than a part of the inner bottom surface of the base part disposed at an upper position of the 3rd region.

5. The image processing apparatus according to claim 3, wherein the housing part of the base part has a positioning part formed to determine a relative position of the detector with respect to the base part.

6. The image processing apparatus according to claim 3, further comprising a cable having one end connected to the reflection type optical sensor and the other end connected to the electronic circuit board,
wherein:
the holder comprises a cable holding part holding the cable and a sensor holding part holding the reflection type optical sensor; and
the cable is disposed at a position which is on an upper side with respect to the base part and is covered with the cable holding part.

7. The image processing apparatus according to claim 6, wherein the cable holding part has a claw part formed to let the cable be hooked to the claw part and thereby to prevent the cable from coming off the cable holding part.

8. The image processing apparatus according to claim 7, wherein the cable holding part has a restricting part formed to be hooked to the base part to restrict deviation of the cable holding part in a direction departing from the base part.

9. The image processing apparatus according to claim 8, wherein the restricting part is formed to further restrict deviation of the cable toward a position opposing the cable with respect to the restricting part, by contacting the cable.

10. The image processing apparatus according to claim 6, wherein:
the holder is configured such that the cable holding part is formed to extend in one direction and the sensor holding part is provided at one end in a longer direction of an extended shape of the cable holding part;
the holder has an insertion part at an end at which the sensor holding part is provided, the insertion part being inserted into a catching part of the base part, and a screw fastening part at an opposite end of the end at which the sensor holding part is provided, the screw fastening part being screwed to the base part; and
the holder is attached to the base part by inserting the insertion part into the catching part and then screwing the screw fastening part to the base part.

11. The image processing apparatus according to claim 1, wherein:

the supporting part is formed in a rectangular shape when viewed from above, an origin position being defined at one of four corners of the rectangular shape of the supporting part;

the image reader has a plurality of reading elements arranged in a main scanning direction, the image reader being configured to read an image formed on the object to be read while moving the plurality of reading elements in an auxiliary scanning direction; and the detector is disposed to detect existence of the object to be read having a particular size when the object to be read having the particular size is supported on the supporting part in a state where a longer side of the object to be read having the particular size is oriented to coincide with the auxiliary scanning direction and a corner of the object to be read is positioned at the origin position, and not to detect existence of the object to be read having the particular size when the object to be read having the particular size is supported on the supporting part in a state where the longer side of the object to be read having the particular size is oriented to coincide with the main scanning direction and a corner of the object to be read having the particular size is positioned at the origin position.

\* \* \* \* \*

UNITED STATES PATENT AND TRADEMARK OFFICE
CERTIFICATE OF CORRECTION

PATENT NO. : 10,063,726 B2
APPLICATION NO. : 15/444441
DATED : August 28, 2018
INVENTOR(S) : Kazuhiro Nakashima et al.

Page 1 of 1

It is certified that error appears in the above-identified patent and that said Letters Patent is hereby corrected as shown below:

In the Claims

In Column 12, Claim 7, Line 40:
Please delete "the claw part and thereby to prevent" and insert --the claw part to prevent--

Signed and Sealed this
Twenty-ninth Day of January, 2019

Andrei Iancu
*Director of the United States Patent and Trademark Office*